United States Patent [19]

Paulson

[11] Patent Number: 4,553,230

[45] Date of Patent: Nov. 12, 1985

[54] VIBRATION FREE TURNTABLE APPARATUS

[76] Inventor: Rollie W. Paulson, 6119 9th Ave. South, Gulfport, Fla. 33707

[21] Appl. No.: 642,548

[22] Filed: Aug. 20, 1984

[51] Int. Cl.$^4$ ............................................... G11B 1/00
[52] U.S. Cl. ..................................... 369/263; 369/247
[58] Field of Search ................ 369/263, 247, 255, 258

[56] References Cited

U.S. PATENT DOCUMENTS

| | | | |
|---|---|---|---|
| 3,156,472 | 11/1964 | Brock | 369/244 |
| 3,235,267 | 2/1966 | Rangabe | 369/224 |
| 3,771,797 | 11/1973 | Braun | 369/255 |
| 4,325,133 | 4/1982 | Reitmayer | 369/263 |
| 4,381,556 | 4/1983 | Bouydon et al. | 369/213 |
| 4,429,381 | 1/1984 | Paulson | 369/266 |
| 4,475,184 | 10/1984 | Cooper et al. | 369/263 |

*Primary Examiner*—Steven L. Stephan
*Attorney, Agent, or Firm*—Ronald E. Smith

[57] ABSTRACT

A platform that is magnetically suspended relative to a base. Magnet members are deployed atop and about the periphery of the base in fixedly secured relation thereto and oppositely polarized magnet members are secured to the bottom and about the periphery of the platform so that a magnetic repulsion exists between such magnet members in sufficient intensity to maintain the platform in suspended relation above the base. Taut guy wires disposed about the respective perimeters of the platform and the base maintain the base and platform in their cooperative dispositions. The base is provided with a plurality of upstanding post members and the platform is provided with a plurality of depending post members. The guy wires are grouped in pairs, and opposite ends of the guy wires in each pair are fixedly secured to different ones of the base and platform post members so that the platform does not slip out of the magnetic field. A turntable and tone arm may be employed to provide a record playing apparatus that is substantially vibration free.

5 Claims, 2 Drawing Figures

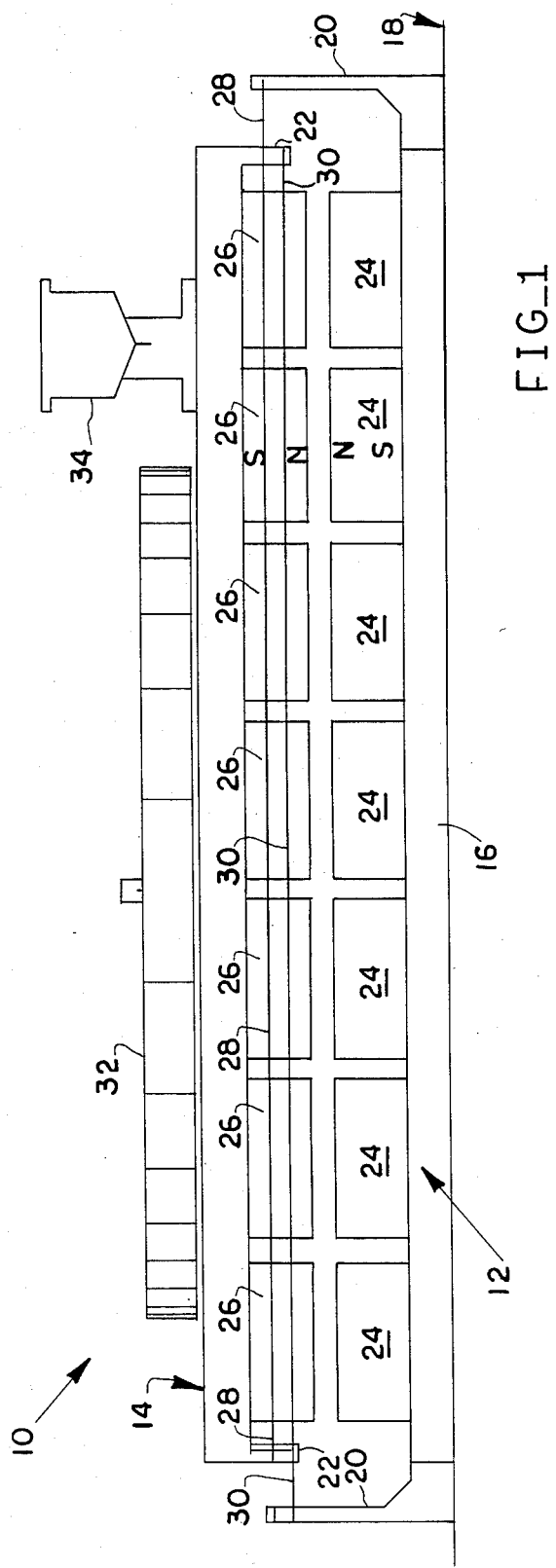
FIG_1

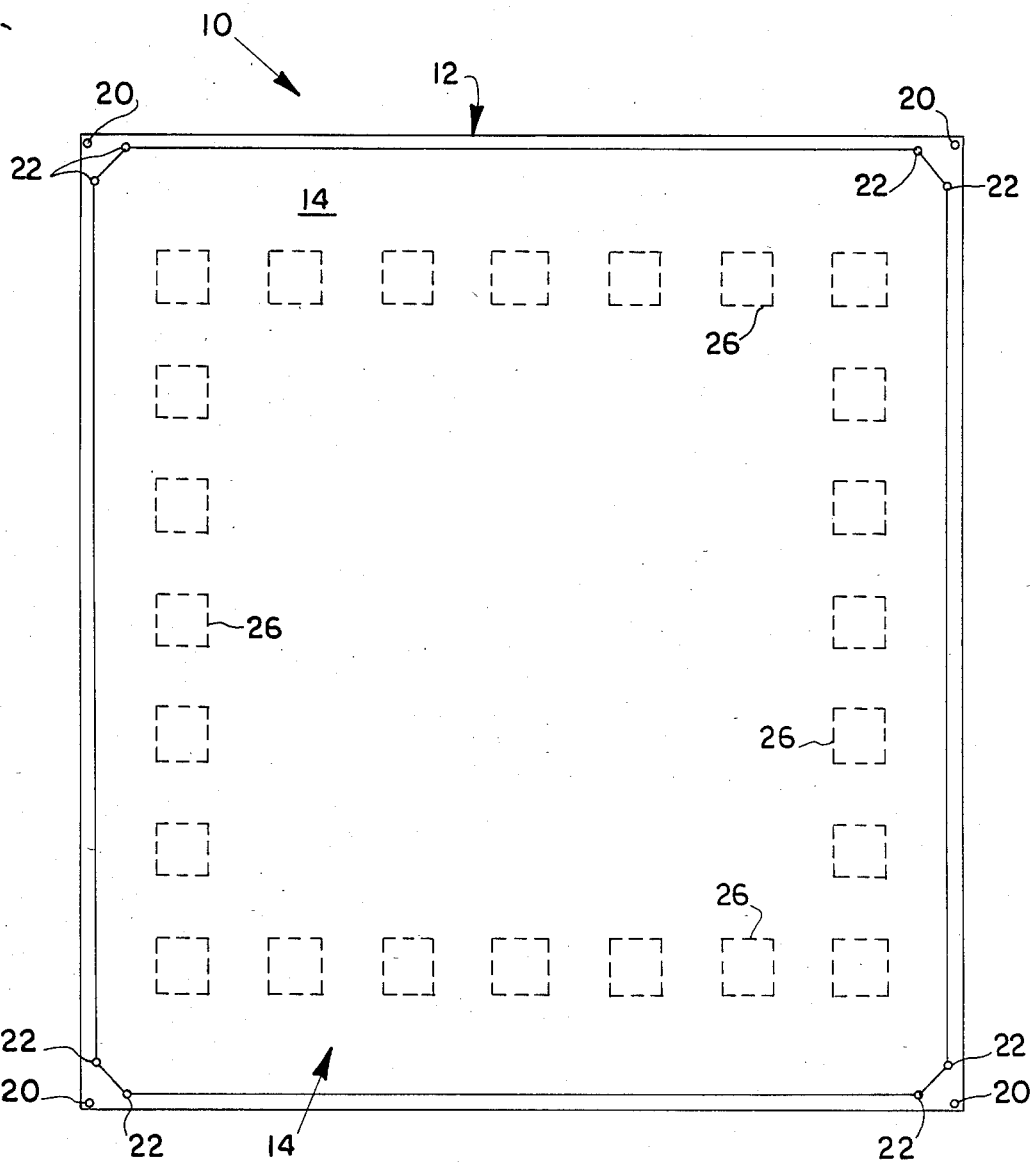
FIG_2

VIBRATION FREE TURNTABLE APPARATUS

BACKGROUND OF THE INVENTION

1. Field of the Invention

This invention relates to magnetically suspended platforms in general, and to a magnetically suspended platform that is stabilized relative to a stationary base by guy wires in particular.

2. Description of the Prior Art

A search of United States patents that was conducted prior to the filing of this disclosure indicated that the following patents have been awarded in the field of this invention: U.S. Pat. Nos. 3,309,094 to Stanton; 3,751,044 to Sawada; 3,784,853 to Wangsness and 4,194,743 to Ohsawa.

None of the earlier patents include the use of guy wires to maintain a magnetically suspended platform in a stable position above a base member.

Conventional turntables suffer from the effects of vibration, whether the vibration is generated by the motor that rotates the turntable, or by other sources. In either event, it is desirable to isolate the platform that carries the turntable from the source of vibrations. This can be done by magnetically suspending a turntable-carrying platform above a base member, or in the alternative a self-contained phonograph record player can simply be deposited as a whole atop a magnetically suspended platform.

A problem encountered by earlier inventors has been the stabilization problem. The platform that is magnetically suspended above a base through the device of aligned, matching polarity magnets, readily slips out of the magnetic field that separates the base and platform. If the base and platform are rigidly interconnected, then vibrations appearing in the base will be transmitted to the platform.

There is a need for a means that will interconnect a suspended platform and a base in such a way that the platform will not slip out of the magnetic field that supports it, and that will not allow transmission of vibrations from the base to the platform, but the needed means does not appear in the art that pre-dates this disclosure.

SUMMARY OF THE INVENTION

The longstanding but heretofore unfulfilled need for an apparatus capable of shielding vibration-sensitive devices from vibrations by mounting the sensitive device on a cushion of air created by mutually repulsive magnetic fields and further providing a means whereby the suspended device does not slip out of the magnetic field is now fulfilled in the form of an apparatus that employs strategically positioned guy wires.

A square or rectangular base member has a plurality of upstanding post members at its corners and a similarly shaped platform member is provided with a number of posts depending to it. Magnets arrayed on the top of the base member and the bottom of the platform member serve to provide the magnetic repulsion that maintains the platform in vertically spaced relation upwardly of the base member. The guy wires are grouped in pairs and a first member of each pair has its first end secured to an upstanding base member post and its opposite, second end secured to a depending platform member post. The other guy wire of the pair has its first end secured to a depending platform member post and its second end secured to an upstanding base member post. The guy wires of a pair are aligned in a common vertical plane, and where the depending platform member posts are positioned inwardly of the upstanding base member posts, the latter may be apertured to allow the guy wires to extend therethrough.

It is the primary object of this invention to provide a means whereby a magnetically suspended platform is prevented from slipping out of its supporting magnetic field.

It is a closely related object of this invention to provide a means whereby a magnetically suspended platform is held in a preselected precise alignment with a magnetic field.

Another object is to provide a magnetically suspended platform of the type adapted to carry a turntable for a sound reproducing device such as a phonograph record player.

Still another object is to provide a platform suitable for supporting an unmodified conventional phonograph record apparatus so that such apparatus will be shielded from vibrations.

The invention accordingly comprises the combination of elements, features of construction, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a simplified side elevational view of a preferred embodiment of the invention.

FIG. 2 is a plan view of the embodiment shown in FIG. 1, which view has been simplified by omitting the guy wires therefrom.

Similar reference numerals refer to similar parts throughout the several views of the drawings.

DETAILED DESCRIPTION OF THE PREFERRED EMBODIMENT

Referring now to FIG. 1, it will there be seen that an embodiment that illustratively depicts the invention is indicated by the reference number 10 as a whole. The apparatus 10 includes a base member 12 of substantially square configuration in this particular embodiment, and a platform member 14 of similar configuration, although of lesser width and length dimensions.

The base member 12 has a flat medial portion 16 and is therefore adapted to be supported by a flat, preferably horizontal, support surface 18 such as a table.

Upstanding post members, collectively designated 20, are integrally formed with or fixedly secured to the base member 12 at its corners. When a square configuration is employed, the preferred number of post members 20 is four (4). A plurality of post members, collectively designated 22, depend to the platform member 14 at its beveled corners as depicted in FIG. 2. The beveling of the corners as shown in FIG. 2 is omitted from FIG. 1 to simplify such FIG.

A plurality of permanent or other type of magnets are deployed about the perimeter of the base member 12 on the upper surface of the flat medial portion 16 and are collectively referred to by the numeral 24. An equal number of magnets, collectively designated 26, are fixedly secured to the lower surface of the platform 14 as depicted and each of them is specifically positioned so that it is in precise vertical alignment with its associated base member magnet 24.

This precise alignment is maintained by the upper and lower guy wires, 28 and 30, respectively. As shown in FIG. 1, upper guy wire 28 extends between a depending platform member post 22 and an upstanding base member post 20 and is taut so that such posts are interconnected. The lower guy wire 30 interconnects an upstanding base member post 20 and a depending platform member post 22 in similar fashion. Thus, the opposite ends of each guy wire 28, 30 are fixedly secured to different ones of the base member 12 and the platform member 14. This same arrangement, in a square or rectangular embodiment, is repeated on each of four (4) sides of the apparatus. Thus, in the embodiment under discussion, a total of eight (8) guy wires are required to achieve the objects of this invention. The guy wires selected should be extensible to allow platform 14 to move relative to base 12. String may be used in lieu of wire.

The guy wires have been omitted from the plan view, FIG. 2, to better show the platform 14. It is clear, however, that each pair of upper and lower guy wires 28, 30, must be disposed in a common vertical plane. Thus, the depending platform member posts 22 may be provided with upper and lower apertures, not specifically illustrated, to receive such guy wires. However, it is believed that the apertures need not be provided and the guy wires may simply abut such depending posts 22 if desired.

The magnet members 24, 26, are specifically positioned so that their like poles are in juxtaposition with one another. The mutual repulsion thereby harnessed maintains the platform 14 in suspended relation above the base member 12 as desired so that vibrations appearing in the base will not be transmitted to the platform. The guy wires are preferably formed of string so that the same will not resonate and so that any vibrations appearing therein will be substantially attenuated.

An unmodified conventional phonograph record player may be deposited atop platform 14 to shield it from vibrations. In this manner, the inventive apparatus can be enjoyed by consumers in the absence of incurring the expense of purchasing an entire record playing unit. However, the magnetic suspension herein disclosed may be provided in original equipment of the type depicted in FIG. 1. A turntable is shown rotatably supported by the platform 14 and is designated by the reference numeral 32. A tone arm 34 is also depicted in such FIG. Tone arm 34 may be mounted on platform 14 or on a separate platform. FIG. 1 should be interpreted as disclosing both embodiments. Where the tone arm 34 is provided with its own platform, the platform 14 (and base 12) may move relative to the tone arm 34 when a record is being played so that the tone arm 34 need not swing toward the center of the record. U.S. Pat. No. 4,429,381, awarded Jan. 31, 1984, to the present inventor, shows such a straight line tracking turntable. The present invention is not restricted to conventional or straight line tracking turntables, however.

It will thus be seen that the objects set forth above, and those made apparent by the foregoing description, are efficiently attained, and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

That which is claimed is:

1. An apparatus for supporting portable articles of the type desired to be protected from vibrations, comprising:

a substantially rectangular in configuration base member having a flat bottom;

a support means for supporting said base member in a substantially horizontal plane;

a plurality of upstanding post members disposed at preselected positions about the perimeter of said base member, a substantially rectangular in configuration platform member having a flat bottom;

a plurality of depending post members disposed at preselected positions about the perimeter of said platform member;

a plurality of base magnet members fixedly secured to the top of said base member;

a plurality of platform magnet members fixedly secured to the bottom of said platform member;

said platform member being disposed upwardly of said base member;

said base magnet members and said platform magnet members having an opposite polarity and being disposed in vertically spaced relation to one another so that the repulsive forces therebetween maintain said base member and said platform member in spaced apart relation to one another;

alignment means for maintaining said base member and said platform member in said magnetically-established spaced relation to one another;

said alignment means comprising eight in number taut guy wires disposed in interconnecting relation to preselected ones of said upstanding post members and said depending post members, a pair of parallel, vertically spaced guy wires being associated with each of the sides of said base and platform members;

said platform member having length and width dimensions less than the corresponding dimensions of said base member so that the depending post members of the platform member are spaced inwardly of the upstanding post members of the base member when said base magnet members and said platform magnet members are aligned with respect to one another;

each of said guy wire members having a first end secured to an upstanding post member and a second end secured to a depending post member;

a first guy wire in a pair of wires having its first end secured to an upstanding post member and its second end secured to a depending post member;

a second guy wire in a pair of wires having its first end secured to a depending post member and its second end secured to an upstanding post member;

whereby an article sought to be supported and insulated from vibrations may be disposed atop said platform member and protected from vibrations by the inability of vibrations to traverse the gap between said platform magnet members and said base magnet members.

2. The apparatus of claim 1, further comprising, a turntable member rotatably supported by said platform member, a stationary tone arm supporting member disposed in spaced relation to said turntable member, a tone arm member pivotally mounted on said tone arm supporting member, means for effecting linear travel of said turntable so that needle-guiding grooves on a record being supported and rotated by said turntable member successively move toward said tone arm member attendant playing of said record, said means enabling said tone arm to remain substantially stationary during said playing of said record, whereby said turntable member is isolated from vibrations that may appear on said base member, but whereby said tone arm member is supported by its own support means which is separate and distinct from said base member and said platform member.

3. The apparatus of claim 1, wherein the taut guy wires are made of a non-resonating material.

4. The apparatus of claim 3, wherein the taut guy wires are formed of string.

5. The apparatus of claim 4, wherein the base magnet members and the platform magnet members are disposed about the periphery of the base member and the platform member, respectively.

* * * * *